United States Patent [19]

Magers

[11] 4,355,962

[45] Oct. 26, 1982

[54] PUMP DISPENSER WITH SEALING PLUNGER

[75] Inventor: Wallace F. Magers, Leawood, Kans.

[73] Assignee: Realex Corporation, Kansas City, Mo.

[21] Appl. No.: 106,924

[22] Filed: Dec. 26, 1979

[51] Int. Cl.[3] .................... F04B 21/04; F04B 39/10; G01F 11/02

[52] U.S. Cl. .................................. 417/552; 222/321; 222/383

[58] Field of Search ................ 417/550, 552; 222/321, 222/341, 383

[56] References Cited

U.S. PATENT DOCUMENTS 4,162,746 7/1979 Anderson .......................... 222/321

4,234,127 11/1980 Tada .................................. 222/321

4,262,823 4/1981 Mondon ............................ 417/566

*Primary Examiner*—William L. Freeh

*Attorney, Agent, or Firm*—Schmidt, Johnson, Hovey & Williams

[57] ABSTRACT

The hand-operated pump has a piston which is reciprocated within the hollow pump body by a plunger which itself is reciprocated through an opening in a collar at one end of the pump body. When the plunger is in a fully extended condition at one end of a stroke, a direct seal is obtained between an annular projection on the plunger and an annular groove on the collar which receives said projection. Thus, leakage is prevented along the interface between the plunger and the collar through the opening during shipment or accidental inversion of the pump at other times.

3 Claims, 6 Drawing Figures

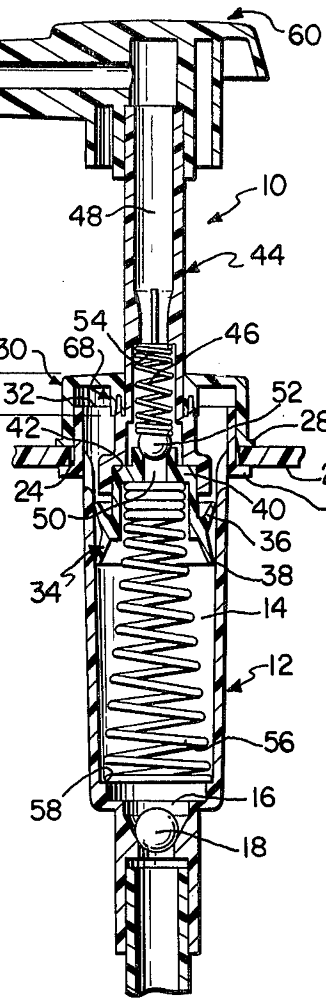
FIG. 1
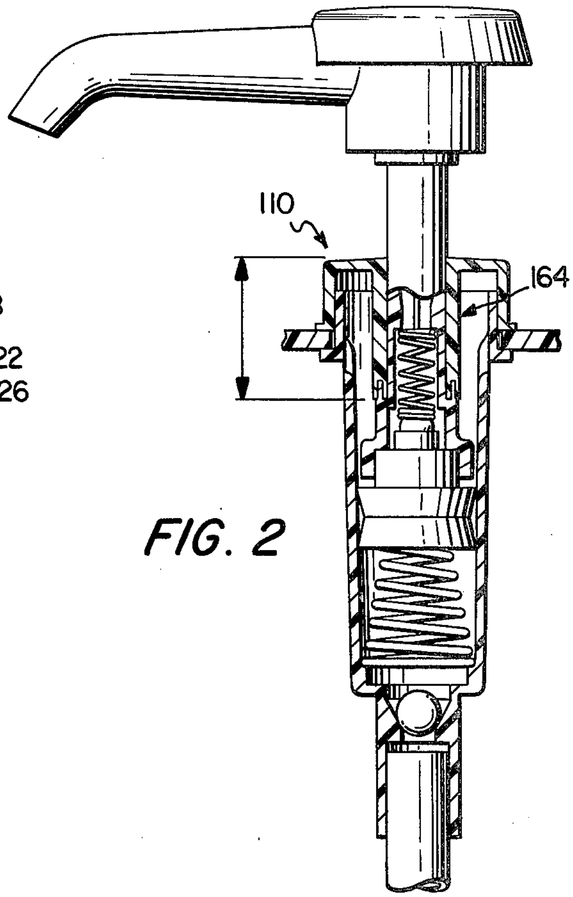
FIG. 2
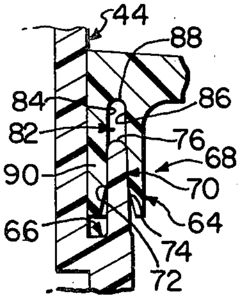
FIG. 6
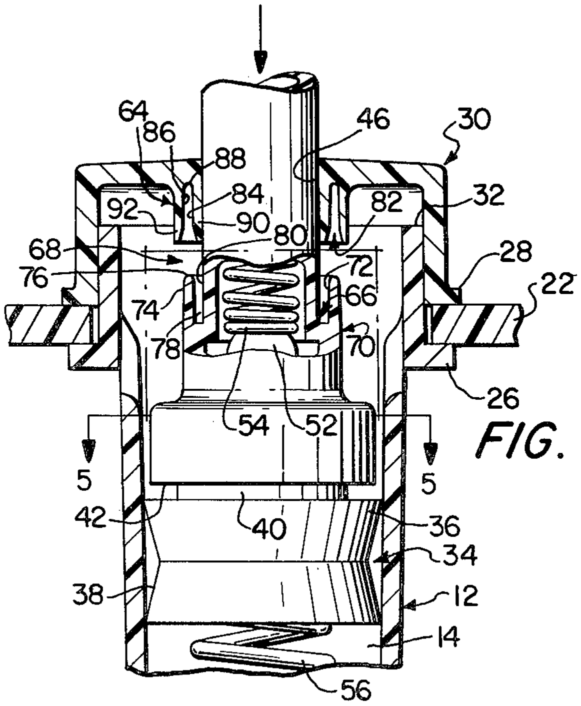
FIG. 3
FIG. 4
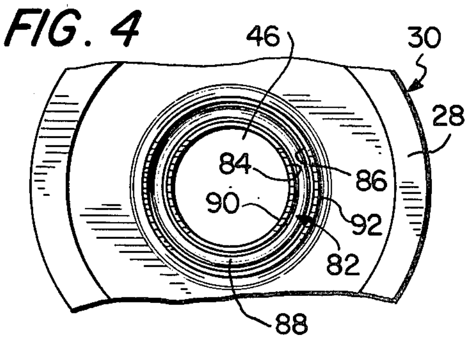
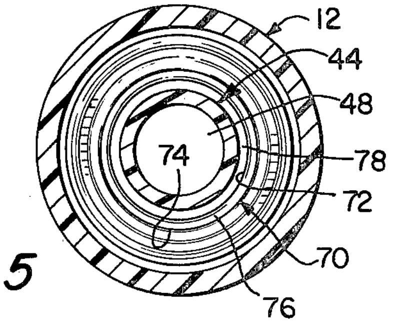
FIG. 5

PUMP DISPENSER WITH SEALING PLUNGER

TECHNICAL FIELD

This invention relates to hand-operated liquid dispensing pumps and, more particularly, to a way of sealing the opening through which the plunger of such pumps reciprocates so as to prevent leakage during shipment and the like.

BACKGROUND ART

It is known to effect a fluid-tight seal between the collar of a pump and the piston thereof when the plunger is at full extension, but to my knowledge, this type of indirect seal between the plunger and collar has been used exclusively on pumps in which the piston also doubles as a valve to open and close a port in the plunger, thereby requiring that the piston be shiftable between port opening and port closing positions relative to the plunger. Accordingly, the quality of seal is to some extent sacrificed, not only due to the moveable nature of the piston relative to the plunger, but also due to the way in which the seal is accomplished indirectly through components other than the plunger when it is the plunger itself that needs to be sealed with the collar in order to prevent leakage.

SUMMARY OF THE PRESENT INVENTION

Therefore, one important object of the present invention is to provide a direct seal between the plunger and its guiding collar when the plunger is at full extension so as to eliminate the chances for shortcomings of various kinds which can be experienced where indirect seals of the plunger and collar are attempted via shiftable pumping pistons or the like and the collar.

Pursuant to the foregoing, the present invention contemplates using a portion of the plunger itself to matingly engage and seal with a portion of the collar through which the plunger reciprocates. An annular, mating projection and groove on the plunger and collar respectively, or vice versa, complete the seal of the opening through which the plunger reciprocates when the plunger is at full extension at one end of the stroke. The projection wedges into the groove when the plunger is at full extension, and this not only seals the collar opening, but also stops further extension of the plunger so as to determine the stroke length of the plunger. The groove is located in a boss that depends from the collar and may be molded in a variety of axial lengths without contacting the sidewalls of the body. Thus, the length of the boss may be varied to correspondingly vary the volumetric capacity of the pump strokes but without sacrificing the quality of seal obtained.

BRIEF DESCRIPTION OF THE DRAWING

FIG. 1 is a fragmentary vertical cross-sectional view of a dispensing pump constructed in accordance with the principles of the present invention;

FIG. 2 is a view of a dispensing pump similar to FIG. 1, but in this figure the pump has a reduced dispensing capacity per stroke as a result of the lengthened nature of the depending boss on the collar;

FIG. 3 is an enlarged, fragmentary longitudinal cross-section view through the pump with the plunger slightly depressed to reveal details of the direct seal between the plunger and collar;

FIG. 4 is a fragmentary plan view of the interior side of the collar;

FIG. 5 is a transverse cross-sectional view through the pump taken substantially along line 5—5 of FIG. 3; and FIG. 6 is an enlarged, fragmentary view of the wedged-together projection and groove of the seal.

DETAILED DESCRIPTION

The dispensing pump 10 of FIG. 1 is provided with an elongated hollow or tubular body 12 defining an internal chamber 14 provided with an inlet 16 at the lower end thereof which is controlled by a valve ball 18. A dip tube 20 projects downwardly from the lower end of the body 12 for insertion into a liquid to be dispensed, and normally such liquid will be contained with a suitable container provided with a closure having a top wall 22. The body 12 is inserted through a hole 24 in the top wall 22. A radially outwardly projecting lip 26 adjacent to the upper end of the body 12 underlies the top wall 22, so as to cooperate with a radially outwardly projecting flange 28 which overlies the wall 22 in clamping the pump 10 tightly in place on the closure. The flange 28 comprises part of a collar 30 which may be threaded down onto or otherwise attached to the open upper end 32 of the body 12.

The pump 10 further includes a piston 34 having upper and lower radially outwardly flaring skirts 36 and 38 respectively, both being of annular configuration and being adapted for sliding contact with the interior surface of the body 12. The piston 34 has a centrally disposed, normally upwardly projecting boss 40 which is snugly received within the enlarged, open lower end 42 of a plunger 44 of the pump 10, thereby attaching the piston 34 to the plunger 44 for movement with the latter as it reciprocates axially through an opening 46 in the collar 30.

The plunger 44 is tubular, defining a central passage 48, and the piston 34 is provided with a central port 50 therethrough which is adapted to communicate the passage 48 with the chamber 14 depending upon the position of a valve ball 52 which normally closes the port 50 under the influence of a compression spring 54 contained within the passage 48. A longer spring 56 captured between the piston 34 on the one hand and the lower end 58 of the body 12 on the other hand serves to yieldably bias the plunger 44 toward its fully extended position of FIG. 1, the pump further including a head 60 which may be depressed to operate the plunger 44 and which is provided with an internal discharge conduit 62 communicating at all times with the passage 48.

The collar 30 has internal depending structure in the form of a boss 64 of annular configuration which projects axially down into the body 13 and which circumscribes the opening 46. On the other hand, the plunger 44 is provided with a shoulder 66. The boss 64 is smaller in transverse dimension than the internal diameter of the body 12 such that the boss 64 may be formed in any number of lengths so as to correspondingly provide different stroke lengths for the plunger 44. This may be seen by comparing pump 10 of FIG. 1 with the pump 110 of FIG. 2, for example, wherein the boss 64 of the pump 10 is relatively short compared to the boss 164 of the pump 110. As a result of the reduced diameter of the boss 64 relative to the internal dimensions of the body 12, the boss 64 will not interfere with or in any way engage the body 12 regardless of the particular length selected for the boss 64.

The boss 64 on the collar 30 and the shoulder 66 on the plunger 44 are provided with means to effect a direct, fluid-tight seal between the plunger 44 and the collar 30 when the plunger 44 is fully extended. In this regard, the seal may be broadly denoted by the numeral 68 and, as aforementioned, includes as one part thereof a portion of the plunger 44, and as a second part thereof, a portion of the collar 30. That portion of the plunger 44 involved is the shoulder 66 which is provided with an annular projection 70 having generally axially extending, flat, radially inner and outer surfaces 72 and 74 respectively. Surfaces 72 and 74 converge toward an annular, slightly rounded tip 76 facing the collar 30 in one axial direction. A void or annular channel 78 is defined immediately radially inboard of the surface 72 and above the shoulder 66.

On the other hand, the boss 64 is provided with an annular groove 82 disposed to wedgingly receive the projection 70 of the plunger 44, such reception being illustrated in FIG. 6. The groove 82 is defined between annular, radially inner and outer surfaces 84 and 86 respectively which are essentially flat and which converge axially to a slightly rounded root 88 of annular configuration with a radius matching that of the tip 76 of the projection 70. As a result of the matching relationship between the surfaces 72, 74 and 84, 86, continuous surface-to-surface engagement is maintained between the projection 70 and the confines of the groove 82 when the projection 70 is fitted within the groove 82. This flush surface-to-surface engagement provides a very effective fluid-tight seal.

It is also to be noted that the projection 70 wedges into the groove 82 before the tip 76 "bottoms out" against root 88 and before any portion of the boss 64 can abut the shoulder 66. Thus, the extension stroke of plunger 44 does not stop until the sealing fit between projection 70 and groove 82 is completely effected.

The boss 64 is also provided with an inner annular ring 90 immediately adjacent and circumscribing the face 80 of the remainder of plunger 44, said ring 90 being tightly received within the channel 78 above the shoulder 66 when both parts of the seal 68 are snugly interfitted. A radially outer ring 92 on the boss 64 slips along the outer surface 74 of the projection 70 when both parts of the seal 64 are sealingly interengaged.

OPERATION

From the foregoing description, the operation of the pumps 10 and 110 should be readily apparent. It is of course to be understood that in spite of the different stroke capacities of the pumps 10 and 110 arising as a result of the different lengths of their bosses 64 and 164, both pumps 10 and 110 operate in precisely the same manner.

Suffice it to point out then, that during the depression stroke of the plunger 44, the ball valve 18 seals off the inlet 16, causing any liquid within the chamber 14 to forcibly unseat the ball valve 52 of port 50 as a result of the pumping pressure applied by the downwardly moving piston 34. Consequently, the liquid is forced up through the passage 48 and out the conduit 62 of head 60. During the subsequently ensuing extension stroke of the plunger 44, the upwardly moving piston 34 generates a negative pressure within the chamber 14, causing the ball valve 18 to lift off its seat, opening the inlet 16 and drawing in a new charge of liquid via the dip tube 20. Upper ball valve 52 seals the port 50 at this time under the influence of the compression spring 54, and at the completion of the extension stroke, the pump 10 is fully loaded and in readiness for the next depression stroke.

As aforementioned, the wedging fit between the projection 70 and the groove 82 limits the extension stroke of the plunger 44, thereby also determining the volume of liquid loaded into the chamber 14 during each suction stroke and the corresponding volume of liquid discharged through the conduit 62 during each depression stroke. Each time the plunger 44 completes an extension stroke, both parts of the seal 68, i.e. the projection 70 of the plunger 44 and the groove 82 of the collar 30, become interfitted in tight, sealing engagement with one another so that the plunger 44 is directly sealed against and with the collar 30. Consequently, any liquid which might find its way to the upper regions of the valve body 12 during shipment of the pump 10 and the container on which it is mounted is prevented from leaking through the opening 46. Due to the direct sealing relationship which is achieved between the plunger 44 and collar 30, the quality of seal effected can be quite high, to the end that unsightly and possibly damaging leakage can be avoided to a greater degree than heretofore possible.

I claim:

1. In a liquid dispensing pump having a piston that is operated within the hollow body of the pump by a plunger that reciprocates axially through an opening in a collar at one end of the pump body, the improvement comprising a direct seal between the collar and the plunger when the latter is at one end of a stroke for preventing leakage through said opening, said seal including:

an annular projection as one part of said seal; and means defining an annular groove as the other part of said seal and disposed for matingly receiving said projection;

said parts comprising portions of the collar and the plunger respectively, said sealing portion of the plunger being separate from said piston, spaced axially from the latter, and immobile relative to the remainder of the plunger, said groove having an outermost annular mouth, an innermost annular root, and a pair of opposed sidewalls extending between said mouth and said root, said projection having an outermost tip and a cross-sectional thickness dimensioned to cause the projection to wedge into sealing engagement with said sidewalls of the groove at said one end of a stroke before the tip engages said root, the point at which said wedging occurs thereby determining the length of the stroke.

2. In a liquid dispensing pump as claimed in claim 1, wherein said projection is on the plunger and said groove is on the collar.

3. In a liquid dispensing pump as claimed in claim 1, wherein said groove is located in structure projecting axially into the body from said collar, said structure being so configured relative to the body that the structure may be provided with a variety of axial lengths without engaging the body so as to correspondingly limit the stroke of the plunger.

* * * * *